United States Patent
Marks et al.

[11] Patent Number: 6,074,537
[45] Date of Patent: *Jun. 13, 2000

[54] EQUIPMENT FOR ELECTOCHEMICAL COLLECTION REMOVAL OF IONS

[75] Inventors: Robert E. Marks; Stephen D. Field; Mary Madden Field, all of Baton Rouge, La.

[73] Assignee: Compliance Consultants, Inc., Baton Rouge, La.

[*] Notice: This patent issued on a continued prosecution application filed under 37 CFR 1.53(d), and is subject to the twenty year patent term provisions of 35 U.S.C. 154(a)(2).

[21] Appl. No.: 08/848,154

[22] Filed: Apr. 29, 1997

Related U.S. Application Data

[60] Provisional application No. 60/016,417, Apr. 29, 1996.

[51] Int. Cl.⁷ ................................................ C02F 1/461
[52] U.S. Cl. ..................... 204/263; 204/264; 204/627; 204/628; 204/647; 205/702; 205/743; 205/750; 205/771
[58] Field of Search ........................ 204/627, 628, 204/647, 264, 263; 205/702, 743, 750, 771

[56] References Cited

U.S. PATENT DOCUMENTS

| | | |
|---|---|---|
| H1337 | 5/1994 | Hoeppel . |
| 3,074,865 | 1/1963 | Gaysowski ............... 204/632 |
| 3,251,764 | 5/1966 | Miller et al. ............. 204/632 |
| 3,254,016 | 5/1966 | Stoddard ................. 204/632 |
| 5,254,257 | 10/1993 | Brigano . |
| 5,288,405 | 2/1994 | Lamb, III . |
| 5,312,533 | 5/1994 | Mayr et al. . |
| 5,314,968 | 5/1994 | Frommer et al. . |
| 5,334,313 | 8/1994 | Anderson . |
| 5,350,500 | 9/1994 | Petzold . |
| 5,380,438 | 1/1995 | Nungesser . |
| 5,384,048 | 1/1995 | Hazen et al. . |
| 5,393,427 | 2/1995 | Barnard . |
| 5,423,965 | 6/1995 | Kunz . |
| 5,428,074 | 6/1995 | Cutler . |
| 5,436,160 | 7/1995 | Varadaraj et al. . |
| 5,443,845 | 8/1995 | Felix . |
| 5,451,309 | 9/1995 | Bell . |
| 5,458,747 | 10/1995 | Marks et al. . |
| 5,466,297 | 11/1995 | Goodman et al. . |
| 5,475,154 | 12/1995 | Lundquist et al. . |
| 5,503,774 | 4/1996 | Brons et al. . |
| 5,514,588 | 5/1996 | Vandaraj et al. . |
| 5,525,230 | 6/1996 | Wrigley et al. . |
| 5,540,836 | 7/1996 | Coyne . |
| 5,560,737 | 10/1996 | Schuring et al. . |
| 5,561,056 | 10/1996 | Brons . |

*Primary Examiner*—Arun S. Phasge
*Attorney, Agent, or Firm*—James C. Wray; Meera P. Narasimhan

[57] ABSTRACT

A method and apparatus concentrates, collects and removes heavy metals, other cations, and anions from media permitting generation of electrical fields. The heavy metals and other cations are electrochemically concentrated and precipitated for rapid removal from the aqueous media. The media, which may be aqueous, soils or wastes, is filtered and passed through a cation or anion exchange resin beds. Metals or anions are captured and held in the resin beds. Current is then applied through the resin beds using opposing electrodes of opposite polarity. In the metal removal units, heavy metals and other cations are concentrated around the negative electrode and lifted to a top of the electrode chamber using hydrogen gas lift. The concentrated solution of heavy metals and cations are removed from the chamber above the negative electrode and are circulated to provide additional time for growth and precipitation. Once in a crystalline structure or precipitated form, the elemental metals and metal hydroxides are separated from the aqueous phase using a trap, which retains the crystallates and precipitates. The treated liquid is returned to the chamber beneath the positive electrode for recycling. The anions are concentrated in a similar manner and removed in soluble form from the aqueous media.

32 Claims, 3 Drawing Sheets

EQUIPMENT FOR ELECTOCHEMICAL COLLECTION REMOVAL OF IONS

This application claims the benefit of U.S. Provisional Application No. 60/016,417, filed Apr. 29, 1996.

BACKGROUND OF THE INVENTION

The present invention relates to methods and apparatus for removing heavy metals, other cations and anions from aqueous and non-aqueous media.

Existing systems for removing heavy metals include direct current electrolytic processes. One of the major deficiencies of direct current electrolytic processes is their inability to efficiently remove low level concentrations of toxic anions and cations from aqueous streams. There is a major growing environmental problem of release of contaminants into ponds, lakes, surface water, subsurface water, rivers and oceans. Toxic heavy metals are not biodegradable and usually accumulate in the environment. One major type of contaminant release is that of heavy metals from the mining and smelting industries. Runoff water from operating mines and abandoned mine sites contain both low levels and high levels of toxic heavy metals. Those sites often discharge the accumulated metal wastes into clean streams, thereby contaminating the streams. Severe environmental impacts result. A stop gap technology most widely used to combat that particular problem involves the use of lime for raising the pH of aqueous solutions and for precipitating the heavy metals. A large volume of sludge is produced in which the metals are not concentrated sufficiently to be of interest to a metals reclaimer. That sludge is toxic and accumulates wherever the limiting process is used.

Existing cation or anion ion exchange units collect heavy metals and other cations on the resin surface until breakthrough of one those cations or anions is observed. Conventional regeneration of the resin bed usually occurs by passing 1–2 bed volumes of either strong acid, strong base or salt solution through the resin bed. That is followed by 4–5 bed volumes of flushing and rinse fluids. Those resin beds are typically downflow in service and upflow in the regeneration and rinse cycles. Conventional regeneration procedures produce substantial quantities of hazardous fluids. Metal reclaimers are not interested in reclaiming the metals from the regeneration fluids as they are typically very toxic and the concentration of metals is too low for the reclaimer to make a profit.

Needs exist for methods and apparatus for removing metals, cations and anions from water that are environmentally friendly and economically feasible.

Concerns regarding the presence of heavy metals in water supplies are rapidly increasing. Elements such as cadmium, mercury, silver, chromium, lead, copper and zinc exhibit toxicity in humans. The promiscuous release of heavy metal and toxic anions into the environment pose great dangers because of their toxicity and relative accessibility.

Major sources by which heavy metals enter aquatic environments include the metal processing, metal finishing and plating industries and leachate runoffs from toxic metal dumps. The major toxic heavy metals generated by industrial and mining industries and found in waste water include copper, cadmium, nickel, lead, zinc, chromium, mercury and the radioactive elements radium, thorium and uranium. Related chelating agents are also found in the waste water, including ethylenediaminetetraacetic acid, nitrilotriacetic acid, citrate, tartrate, gluconic acid and the like. More than 13,000 corporations are involved with aspects of metal finishing and electroplating.

A number of specialized processes have been developed to remove heavy metals from industrial waste waters. Processes that have been investigated include: chemical precipitation, ion exchange, solvent extraction, cementation, coagulation/flocculation, complexation, adsorption, electrochemical operations, biological operations, filtration, evaporation and reverse osmosis/ultra filtration.

Current state-of-the-art methods for treating plating wastes from facilities employ precipitation treatment with conventional hydroxide precipitation of a mixed waste water in a single reactor. Nearly 75 percent of existing plating facilities employ precipitation treatment (primarily hydroxide treatment) as the treatment scheme for removal of heavy metals from solutions. It is the most widely used process industrially.

In the hydroxide precipitation process, heavy metals are precipitated by adding an alkali, such as caustic soda or lime to adjust the waste water pH to the point where the metal exhibits its minimum solubility. The metals precipitate as metal hydroxides and can be removed by flocculation and sedimentation. The extent of the precipitation depends on the solubility product ($K_{sp}$) of the metal hydroxide and the equilibrium constants, $K_f$'s, of the metal-hydroxyl complexes. The metal-hydroxide precipitates can be removed by adequate solid-liquid separation processes such as sedimentation and filtration. The effectiveness of separation is highly dependent on the physical properties (size, density, etc.) of those metal hydroxide precipitates. Wide-spread acceptance of the hydroxide treatment is due to its relative simplicity, low cost of precipitant (lime) and ease of automatic pH control. Sulfide precipitation is an alternative process for removal of heavy metals due to the low solubilities of the sulfides. Both processes produce toxic sludges which must be reclaimed or require disposal. The sulfide process has the potential to generate toxic hydrogen sulfide gas and there are environmental concerns associated with the toxicity of sulfides.

Limitations of the hydroxide process include the following: precipitates resolubilize if pH changes; mixed metal wastes require different pH conditions for metals having different precipitation solubilities; the presence of complexing agents has an adverse effects on metals removal; chromium (VI) is not removed by the hydroxide technique; hydroxide sludge quantities are substantial; hydroxide sludges are difficult to dewater due to the amorphous structure; and little metal hydroxide precipitation occurs below pH of 6.

SUMMARY OF THE INVENTION

The present invention is a method and apparatus for removing heavy metals, other cations, and anions from aqueous and non-aqueous media. The heavy metals and other cations are concentrated and precipitated for rapid removal from the aqueous media. The heavy metals, once in a crystalline structure, are separated from the aqueous phase using a trap, which retains the crystalline precipitates. The precipitated metals are recovered as elemental metals or as oxides/hydroxides. The treated liquid is always recycled. The anions are concentrated in a similar manner and removed in soluble form from the aqueous media.

Although the present invention has been developed primarily for use in aqueous media, the present invention is readily modified for use with other applications including conducting gas phase systems and systems including liquids such as hydrocarbons which carry ionic charges (ex. phenols), conducting solids, or any other media or combinations of media which permit ionic mobility in response to an applied electrical charge. Any charged atom or molecule in any conductive media (gas, liquid, porous solid or solid surface) permits transport of an electrical field.

The present invention includes an ion exchange process for collecting the heavy metals, other cations, and anions on selected resin beds. The recovery of heavy metals, other cations and anions is accelerated by the addition of circulating cathodic liquid systems at all resin exchangers. The circulating systems, in conjunction with direct current (DC) electrical systems, supply low level current across both the cation ion exchange resin bed and the anion exchange resin bed. An acidic solution is generated in the liquid at the anode electrode and a basic solution is produced in the liquid at the cathode electrode. The combination of the flow of liquid in the cathodic recycle and the electrical production of acids and bases induce rapid electrochemical changes in the resin beds and strip the heavy metals and anions from the beds. The beds are automatically regenerated in the stripping process. At the conclusion of the stripping process, the cation bed is covered with hydrogen ions and the anion bed is covered with hydroxyl ions. The soluble heavy metals and other cations are typically in the acidic pH regime where they are stripped from the resin bed. Liquid cathodic circulation immediately transports the soluble heavy metals to a basic pH environment. The large majority of heavy metals either plate out as elemental metal or precipitate as oxides or hydroxides. That precipitation is an equilibrium reaction and additional residence time is added to the system for continued growth of the flocculated metals/oxides/hydroxides. The additional residence time is incorporated in the design of the cathode precipitation chamber, external cathodic circulating system and the volume in the heavy metals sedimentation basin (or precipitation trap). The anions and complex ions acting as anions are concentrated and removed in either soluble or precipitated form into a removal tank. The present invention has the capability to remove heavy metals and other cations and complex ions that act as cations in concentrated soluble or precipitated forms.

The high levels of concentration, collection and removal achieved using the present invention provides a valuable financial offset to the cost of operation. The present invention has immediate application in areas where there are either environmental metal concerns (streams, rivers, etc.) and in industries which release metals in waste streams and cleanup of toxic metal holding pits.

The present invention eliminates the need for the lime hydroxide process. The present invention concentrates the heavy metals and soluble anion contaminants and does not produce any hazardous liquid or sludge byproducts. The present system removes heavy metals, other cations and complex ions acting as cations as well as soluble anions and other complex ions acting as anions from surface water, groundwater, aqueous waste streams, lakes, rivers and the like.

The present invention uses all classes and types of resins including but not limited to: strong acid ion exchange resins, strong base ion exchange resins, weak acid ion exchange resins, and weak base exchange resins. The present invention uses synthetic resins or crystalline silicates in packed beds or in flow modes for inorganic-contaminant removal. Particulate resins are usually preferred but other resins may be used to detoxify a specific raw water. The present invention involves metal cation or non-metal anion concentration/phase changes and the collection of heavy metals that are precipitated according to the stability field of the metal as described by the $E_H$ (half cell potential relative to standard hydrogen) and the corresponding pH (negative log of the hydrogen ion). Metals that are soluble base-precipitated to the crystalline state using the present invention include, but are not limited to, aluminum, antimony, arsenic, barium, beryllium, bismuth, boron, cadmium, calcium, cerium, chromium, cobalt, copper, germanium, gold, iron, lead, lithium, manganese, magnesium, molybdenum, mercury, nickel, palladium, platinum, selenium, silver, strontium, thorium, tin, titanium, tungsten, uranium, vanadium, zinc, and zirconium. Anions removed by the present invention include, but are not limited to, chromates, sulfates, chlorides, fluorides, carbonates, bicarbonates, nitrates, hydroxyl ions, phosphates and other metal and non-metal compounds that behave as anions.

The present invention uses the following sequential processes. The first treatment is a simple filtration for removal of dirt, detritus and other suspended matter to prevent the development of a pressure drop across the ion exchange beds. Total dissolved solids, if ionic, participate in the ion exchange process. The second treatment includes processing the filtered aqueous raw water containing the heavy metals and other cation and anion mixtures through sequential conventional strong-acid cation exchange resin beds and through strong-base anion exchange resin beds. That treatment removes the large majority of soluble heavy metals and soluble anions. The process is stopped when breakthrough occurs. Weak acid or base resins are used to selectively remove a financially attractive metal such as copper or a radioactive element such as uranium.

The electrodes located above and below the resin beds are polarity reversible, thereby providing the opportunity to remove heavy metals either from the top or bottom of the resin bed. In preferred embodiments, an upflow concentration system as described below is used. The positive flow-through electrode is positioned immediately below the bottom porous membrane which supports the particulate resin bed. The negative flow-through electrode is positioned immediately above the top membrane of the particulate resin bed. The electrodes are made of impervious materials that have been tested for 3 months at 60 amperes of direct current at a potential difference of 40 volts in soils. No deterioration has been detected.

When cation or anion breakthrough occurs, an electrical/electrochemical process which involves a pH controlled hydroxyl ion recycle is used. The combined electrically-derived electrochemical acidic flow rapidly removes the heavy metals from the resin bed. The heavy metals flow upward through the top of the resin bed and then through an electrified flow-through grid where the electrochemical fluid gradient enters a basic environment above the flow-through electrode. Soluble metals are converted immediately to either the elemental metal state or an hydroxide state. The soluble metals undergo a phase change (called electrochemical dual phase concentration) and the flocculated metals/metal hydroxide particles commence growing and are lifted to the top of the metal concentration chamber by means of a hydrogen gas lift. The gas is composed of very small bubbles of hydrogen which are formed at the surface of the electrified cathode grid which is located above the resin bed and at the bottom of the heavy metal concentration and collection chamber.

The flocculated metals are immediately transported from the concentration and collection chamber by the cathodic recycle stream. The cathodic recycle stream originates at the top of the heavy metal concentration and collection chamber. The recycle passes through the heavy metal and through a metal removal facility which filters out the elemental metals and precipitated metal hydroxides. Secondary metal separation processes are employed to segregate valuable metals from nonvaluable metals. Any soluble heavy metals remaining in the treated liquid recycle stream exiting the heavy metal removal and separation facility are precipitated in subsequent cycles.

The cathode recycle performs a number of functions critical to the success of heavy metal removal and reactivation of the strong-acid ion exchange resin bed. The cathodic recycle provides growth time for the formation (and size) of the metal precipitates. The total time from the start of the recycle stream being pulled from the top of heavy metals concentration and collection chamber until the time that the precipitate-free liquid stream exits the heavy metal removal trap provides a growth period for continued precipitation and enlargement of metal hydroxide particles.

A second major function of the cathodic recycle is performed when the high pH recycle stream enters the bottom chamber below the resin bed. The positive electrode is located in that chamber. The positive electrode is energized with direct current and produces hydrogen ions and gaseous oxygen. The anode pH is highly acidic. The incoming cathode recycle stream entry is below the bottom porous membrane of the cation resin bed and below the positive electrode. The mixing of the anodic fluid and the cathodic recycle results in a partial hydrogen and hydroxyl neutralization. The pH increases to a moderate acidity level and the cathodic liquid recycle moves upwards and into the resin bed. The two forces pushing upward through the resin bed are: the electrical attraction of the positive hydrogen ions to reach the negative cathode at the top of the resin bed and the more important force of the lifting effect of the cathodic liquid recycle by increasing the velocity of the hydrogen ions and by rapidly stripping the heavy metals from the active sites on the resin bed surfaces.

If no recycle were employed, the hydroxyl ions would move downward through the resin bed and substantial volumes of electrolytically-produced water would be reconstituted by neutralization with the upward-moving hydrogen ions. This neutralization would constitute a process efficiency loss. The cathodic recycle prevents any hydroxyl ions from moving downward through the resin bed, as confirmed by the fact that the underside of the top cathode grid is at a moderately acidic pH. Any early precipitation of heavy metals is prevented by the cathode recycle as the low bed pH prevents precipitation in the resin bed. When the precipitation is complete, the recycle is reduced and the pH of the anode is lowered for final reactivation of the resin bed and commencement of the next water treatment cycle. Note that no toxic precipitates are produced for disposal. There are no regeneration fluids such as hydrochloric or sulfuric acids. No rinsing or flushing of the bed, which would produce more toxic by-products for disposal, is included.

Removal of the soluble anions from the strong-base anion exchange resin bed and reactivation of resin are similar to the removal of heavy metals from the cation resin bed. The major difference is that the majority of anions remain soluble throughout wide pH ranges and require removal in a concentrated solution. The solution, as provided in the present invention, includes the novel usage of the basic cathodic recycle. In the case of anion removal, the positive flow-through electrode is located above the top of the anion resin bed and the negative flow-through electrode is located at the bottom of the anion resin bed.

The cathodic recycle is pulled from below the bottom of the cathode and injected above the top of the positive electrode. The largest fraction of the hydroxyl ions travel upwards through the resin bed counter to the downwards flow of the cathodic recycle. The cathodic recycle removes the balance of the hydroxyl ions from below the negative cathode and injects the hydroxyl ions above the top bed positive electrode. A basic environment is maintained above the positive flow-through electrode. The recycle is adjusted to prevent the production of water through the upward flow of any hydroxyl ions into the resin bed and for preventing contact with the downward-moving acidic hydrogen ions. The counter-flow upward movement of the hydroxyl ions through the resin bed sequentially removes the negative anions from the ion exchange sites. The resin bed is initially pH-acidic and is slowly converted to pH-basic as the upward-moving wave of hydroxyl ions increase the resin bed pH. The negative anions move upward, counter to the downward liquid flow of the cathodic pH recycle, and are concentrated in the upper chamber above the positive top electrode. The anions are typically recovered as a concentrated liquid.

Anion concentrations easily reach levels 100 times greater than original raw water anion concentration levels. The concentrated anion material is removed to an anion collection tank for disposal or further processing. Note that no toxic recycle fluids are generated for disposal except for a small volume of concentrated anodic fluids. (One example was that the original 4,000 ml of a toxic raw water containing sulfate and chloride anions was concentrated to a final volume of 40 ml). The rate of the cathode circulating fluid is adjusted until the entire bed pH is at an elevated pH. The anion resin is completely reactivated and a new raw water treatment cycle is repeated.

A comparison of the present invention with the lime hydroxide process clearly evidences the benefits realized using the present invention:

If the pH changes in the lime hydroxide process, resolubilization occurs. In the present invention the pH remains steady and no resolubilization occurs. There is no liming in the present invention.

The use of lime hydroxide with mixed metals is difficult because different metals of different solubilities require different pH conditions. The present invention covers the entire pH range where heavy metals precipitate.

Unlike the lime hydroxide process, the present invention has the capability, by electrical and electrochemical means, to extend the pH range as required for special metal precipitations.

The presence of complexing agents in the hydroxide process has an adverse effect on metal removal efficiency. The present invention does not use any completing agents.

Chromium (VI) is not removed by the lime hydroxide process. In the present invention, the $CrO_4^{2-}$ ions are readily removed using an anion resin and then concentrated in soluble form. The chromate ions are electrolytically reduced to soluble Cr(III) ions and those ions are cathodicly concentrated or cathodicly plated as chromium metal oxides. The present removal methodology has been demonstrated in bench scale experiments.

Cyanides interfere with heavy metal removed via lime-hydroxide precipitation. The present invention treats all electrolytically produced gases, including hydrogen cyanide, hydrogen chloride, hydrogen sulfate, nitric acid and the nerve gases stibine and arsine as well as other non-organically derived poisonous gases. All cation and anion units are equipped with caustic scrubbers on every gas stream. Scrubbers are discrete units and are complete with valving and equipment to insure all hydrogen and oxygen gases are separately treated.

Lime-hydroxide sludges are difficult to dewater. No lime sludges are produced using the present invention.

The lime-hydroxide process does not precipitate metals at pH values less than 6. The present invention precipitates heavy metals from a pH range of 4 and higher.

The present invention is applicable in many fields and applications including, but not limited to, removal of high levels of nitrates from groundwater contaminated by agricultural fertilizers, removal of radiological substances (radionuclides, radioactive complexes) from groundwater, recovery of plating solutions from closed loop processes, replacement/reduction/treatment of alkylation sludges from petroleum refineries, removal of lead from drinking water, removal of arsenic from groundwater, and removal of chromium (VI) from groundwater.

The present invention is applicable for any charged atom or molecule in any conductive media (gas, liquid, porous solid or solid surface).

The present invention is a method and apparatus for use in aqueous media for the electrochemical dual phase concentration, collection, and removal of heavy metals, other cations, and complex ions that act as heavy metals. The present invention also includes methods and means for removing anions and complex anions that act as anions. In addition to aqueous media applications, the present invention is operable in non-aqueous conductive media including but not limited to gaseous, liquid, porous solid and solid surface media. The present invention is capable of removing both low and high concentration of toxic heavy metals and anions from surface waters, ground water and releases from systems containing heavy metals and toxic anions. Low concentrations of a few mg/l of heavy metals up to almost total solubility may be captured using the present invention.

Electrical and electrochemical derived transport and liquid chemical gradient changes are used to achieve highly efficient concentration, precipitation and collection of heavy metals and toxic ions. Changes in chemical gradients are used to partition the precipitated heavy metals into separate heavy metals, groups of contiguous heavy metals, separate metal oxides/hydroxides, groups of contiguous heavy metal oxides/hydroxides and other groups where heavy metals are precipitated as chlorides, sulfates, carbonates, nitrates, fluorides and any other precipitating anions. Heavy metals and radionuclides are also selectivity concentrated, collected and recovered using the present invention.

The present apparatus includes resin beds, membranes, electrical grids and a raw water filter for removing remove dirt and other particulates to prevent fouling of resin beds. The resin beds include alternative types of resins designated strong, basic and weak and are made of conventional materials. Activated alumina adsorption is included for selectively concentrating specified metals or radionuclides. The electrical grids provide efficient sources of acid (hydrogen ion) and base (hydroxyl ion) for initiation of a baseline concentration, collection and precipitation process for removal of heavy metals, and radionuclides and for commencing concentration and collection of soluble toxic anions.

The present invention includes electrochemical cathodic and anodic circulating systems for increasing removal efficiency. The cathodic circulating system generates a liquid chemical gradient which permits rapid removal of heavy metals from the resin bed without any fouling of the resin bed and constitutes the major feature of the dual phase heavy metal removal from the resin bed, concentration of the heavy metals and external collection of the precipitated heavy metals. The cathodic liquid recycle is used in conjunction with electrical/electrochemical gradients to flocculate, precipitate and partition the heavy metals into individual and/or contiguous groups such as elemental states, oxides/hydroxides, and other element precipitations such as sulfates, chlorides, nitrates, carbonates, bicarbonates and any other anion state. The chemical gradient is basic on one side of the electrode and acidic on the other side of the electrode. The range of chemical gradient may vary from strong acid to strong basic for precipitation of heavy metals. The cathodic liquid recycle recovers the heavy metals in either soluble states or precipitated states. In preferred embodiments, the cathodic circulating system operates in such a direction that heavy metals above the resin bed cathode are always at a basic pH while the resin bed is at an acid pH. Anions collected above the resin bed anode are always at a basic pH while below the anode the liquid is at an acidic pH and the resin bed is at a basic pH. The resin beds do not foul readily as heavy metals attached to the resin bed are in a soluble state and heavy metals are flocculated above the resin bed top cathode. Thus no flocculated materials enter the resin bed in a solidified form that would lead to bed fouling and drop in process efficiency.

The present invention further includes an external removal system that is directly tied into a stationary or portable filter trap for collecting the precipitated metals but not the ionic liquids. The stationary or portable trap is noncorrosive and has a capacity for collecting hundreds of pounds of metal hydroxides. The stationary or portable filter trap may be replaced by a partitioned collection system which includes several compartments, with valuable heavy metals partitioned in designated compartments and nonvaluable heavy metals contained in other designated compartments. That partitioning is preferably conducted by automatically switching or partitioning heavy metals to designated compartments by means of computer controlled monitoring of designated process variables.

Minute bubbles of hydrogen gas are formed at the top of the cathode to provide a gas lift for the precipitated heavy metals. The collected heavy metals are easily removed from the top dual phase heavy metals removal chamber.

The present removal system permits continued growth of heavy metal crystalline hydroxide structures and increases heavy metal concentration efficiency. The concentration and removal of soluble anions from the anion resin beds is enhanced by a continuous circulation of caustic or acid for measured concentrations up to 10–30 times original concentrations.

The electrical grids are preferably made of impervious materials that do not dissolve, decay or become coated with non-conductive materials. The resin bed porous filters or membranes perform the function of containment of the particulate resin inside the resin beds. Scrubbers filled with caustic are included in the oxygen and hydrogen gas lines to neutralize all produced gases formed during the electrical/electrochemical production of hydrogen and oxygen from toxic raw water sources.

Preferred embodiments of the present invention include computer assessment and control of key process variables in switching the aqueous or other ion charged media into the service or treatment mode and in switching the treated water or other charged media into the dual phase removal/soluble mode removal of the heavy metals or contaminants from other charged media as well as anions collected on the resin beds. The computer control operates the heavy metal partitioning system when required. The monitors and simple analytical equipment provides input for computer assessment and process control.

A pH control system is preferably included for controlling the liquid rates of the circulating cathodic recycle and the liquid rates of the circulating anodic recycle for enhancement of the removal of the heavy metals cations, other cations and complex ions that act as cations as well as anions and complex ions that act as ions.

In preferred embodiments, the present invention is portable and is skid-mounted for location at raw water processing sites. Portable electrical equipment such as arc welding machines are substituted in locations where no permanent AC electrical facilities are available.

The vessels and piping of the present invention are constructed for preventing the grounding of the electrodes and the reduction or loss of the production of the electrical/ electrochemical transport and chemical gradients required for removals of heavy metals, radionuclides and anions.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
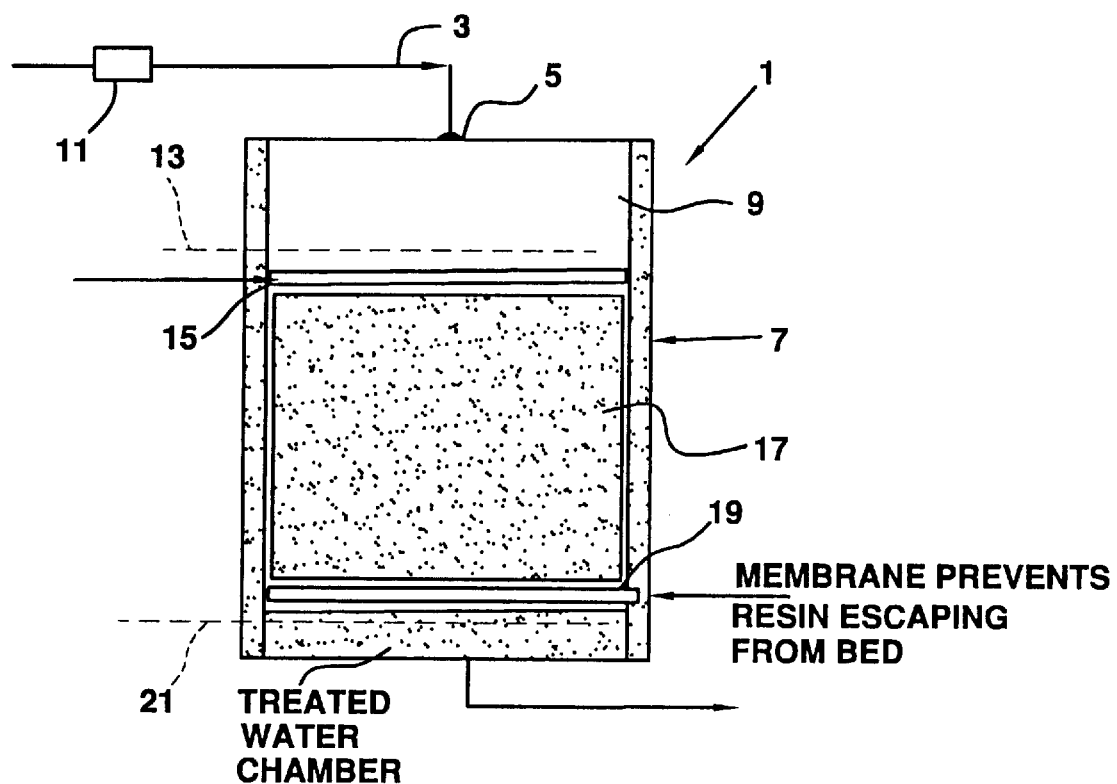
FIG. 1 schematically shows a metal removal unit of the present invention in a service mode, where heavy metals are concentrated and exchanged with hydrogen ions.

FIG. 1 shows a metal removal unit 1 of the present invention wherein heavy metals are concentrated and exchanged for hydrogen ions. Raw water 3 enters through the top 5 of the cylindrical vessel 7 and enters the raw water chamber 9. The raw water 3 has been previously filtered through a conventional inlet filter 11, such as a cartridge, a sand bed, or the like, to remove dirt, grit and suspended matter prior to entry into the raw water chamber 9. The raw water 3 passes through the top circular electrode grid 13. Grid 13 is not electrified during the removal of soluble heavy metal ions. Grid 13 is made of materials which are virtually impervious to all acids or bases. Grid 13 is located above a first porous membrane 15 which covers the top of the resin bed 17. No ion selective membranes are required. A second porous membrane 19 is located at the bottom of the circular bed 17. The membranes 15, 19 prevent resin from escaping from the cylindrical resin bed 17 and also prevents sources of particulates from entering and fouling the resin bed 17. The metal-contaminated water flows in a downflow configuration; upflow designs result in channeling, with resultant low efficiency treatment and early breakthrough. A bottom electrode grid 21 is positioned beneath the second porous membrane 19. The bottom electrode 21 is not electrified during removal of soluble heavy metal ions. The embodiment of the present invention shown in FIG. 1 is an operating bench scale unit where tests have been performed on both raw and synthetic waters over a range of individual cation concentrations from 5 mg/l to 2,000 mg/l.

The reaction which occurs at the surface of the resin particles is an equilibrium reaction. The typical service flow is 0.5 gallons/minute per cubic foot of resin bed with a maximum service flow of 1.0 gallons/minute per cubit foot of resin bed. Rates in excess of those listed above have been confirmed by laboratory test work. The resin used for heavy metal removal is preferably a strong-acid ion exchange resin that is beige in color, opaque, has a structure that is macroporous and crosslinked with polystyrene, and has a sulfonic acid functional group. When the raw water flows through the resin bed, the heavy metals have a stronger affinity for attachment to the resin and accordingly displace the hydrogen ions. The treated water is slightly more acidic than the raw water as a result of the replacement of acidic hydrogen ions by heavy metals. This replacement can be tracked as a wave of acidity moving downwards through the resin bed. When the sites have been filled with heavy metals, the incoming heavy metals will start leaking through the exit (bottom) of the resin bed. This phenomenon is called breakthrough and the process is stopped at this point.

The present invention further provides for the electrochemical dual-phase removal of the metals. The present invention generates very high concentrations of the recovered heavy metals and involves use of less than 5 percent of the regenerants (acids, flushing and rinsing) used in conventional regeneration.

Figure 2:
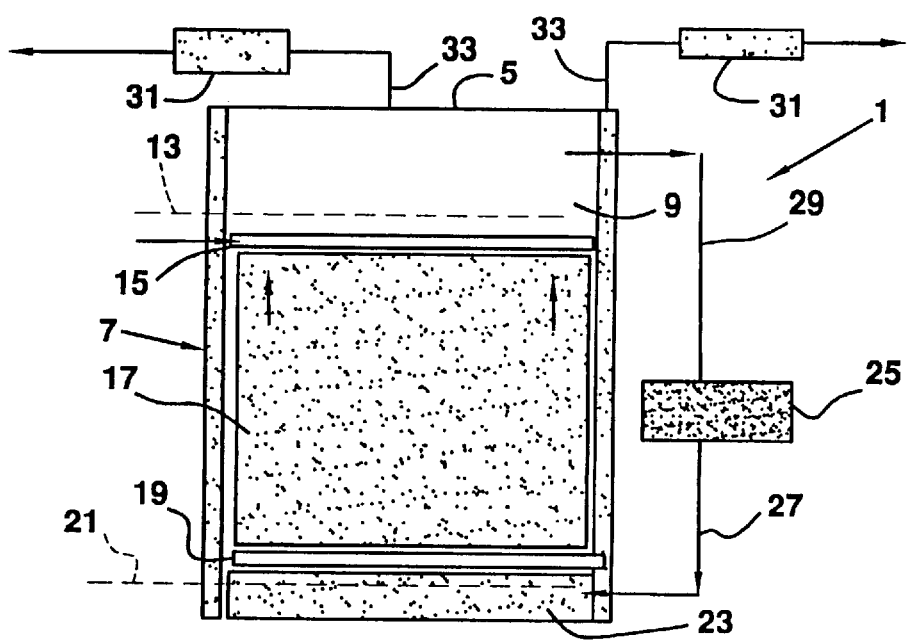
FIG. 2 schematically shows a metal removal unit of the present invention in a heavy metal dual phase removal mode including cathodic recycle enhancement.

As shown in FIG. 2, operation of the dual phase removal is as follows. All inlet raw water valves and outlet treated water valves are closed. The electrodes 13, 21 are energized, with the positive electrode 21 below the bottom porous membrane 19 and the negative electrode 13 above the upper porous membrane 15. Switching the polarity of the electrodes 13, 21 also works but is more cumbersome. The current level is very low and no significant heat is generated so that the integrity of the resin bed 17 is protected against thermal stress. Power levels are raised until slight gassing at both electrodes 13, 21 is observed. The pH of the anodic fluid in the reservoir 23 below the anode and the pH above and below the cathode are monitored until the anode reservoir 23 reaches a specified low pH and the liquid above the cathode reaches a high pH.

In inefficient conventional prior art processes, the only way that the heavy metals can be removed is to use high currents at the positive electrode so that hydrogen ions are produced to electrically strip the heavy metals from the cation resin bed. When electrical gassing occurs at the electrodes, the maximum hydrogen ions and hydroxyl ions are produced at the positive and negative electrodes, respectively. That production of gas at the electrodes is an electrical inefficiency. A further inefficiency of prior art processes is that in a cell of that configuration, the small hydrogen ions move upward faster than the hydroxyl ions move downwards and those ions meet at approximately $\frac{2}{3}$ distance from the anode and one third distance from the cathode and form molecular water. That formed water contains very few ions and does not conduct an electrical charge and adds to the cost of regeneration.

The present invention removes the soluble heavy metals more quickly from the resin bed 17, immediately precipitating the heavy metals and compacting the precipitates into a concentrated valuable by-product of heavy metals without having the disposal problem of large volumes of conventional waste by-products.

The present method uses a cathodic recycle enhancement system. FIG. 2 shows the present system which pulls precipitated heavy metals from the volumetric area above the negative electrode 13. The precipitated heavy metals flow through a solids trap 25 where the elemental metals and metal oxides/hydroxides are removed. The resultant clean cathodic liquid 27 exits the trap and flows into the bottom of the anodic liquid reservoir 23. There is an optimum range where heavy metals will precipitate into crystalline oxides or hydroxides and this range is typically 4–12 pH. The cycle can be described as follows. Anodic liquid at low pH is pressured upward through the resin bed 17 (reverse electro-osmotic effect) which accelerates the anodic liquid upward through the resin bed and more uniformly removes the heavy metals 3–5 times faster than by the simple conventional prior art processes described above.

In a standard electrical regeneration of a cation resin bed, the hydroxyl ions move through the resin bed and either form water as discussed earlier or raise the pH sufficiently to precipitate some heavy metals in the upper third of the resin bed. That precipitation is typically found in electrokinetic soil remediations of heavy metals. The present cathodic recirculation literally solves all the problems which have been discussed, produces a valuable byproduct, and improves the quality of the environment. When the cathodic circulation enhancement is initiated, a flow of metal-enriched precipitates 29 circulates from the space above the cathode 13 (Dual Phase Heavy Metal Crystallization/Removal) and into the precipitated heavy metals removal trap 25. The trap 25 is preferably a portable filter, a sedimentation unit or other similar device which fills up with the crystalline metals. The liquid in that trap 25 is syphoned and returned to the circulating system. The trapped metal solids are removed or a new portable trap is installed. The trapped metal solids are forwarded to a metals reclaimer.

The filtered caustic solution 27 is injected into the bottom of the anode compartment 23 below the resin bed 17. As a result of the circulating cathodic liquid, the hydroxyl ions do not enter the resin bed 17 and the pH just below the bed 17 stabilizes. As the soluble heavy metals are pushed upward through the cathode grid 13, immediate precipitation occurs. The small bubbles of hydrogen gas also play an important role in collection and flocculation of the heavy metal precipitates which form above the energized cathode grid 13 and improve the rate at which the cathodic recycle transports the crystalline metals from the top chamber 9 into the metals removal trap 25. When the precipitation of the circulating fluid ceases as the fluid enters the space above the cathode zone, it is assumed that all exchangeable resin sites have exchanged the heavy metal for hydrogen ions. At this point the pH of the bed 17 may be checked to insure that the pH is low and uniform throughout the resin bed 17. A uniform pH condition throughout the resin bed 17 confirms that the bed is ready to receive another charge of raw water and the sequence is repeated. The treated cation water is either sent to the strong-base ion exchange resin bed or stored in an intermediate tank. Where multiple resin beds are available, modes of total continuous flow for removal of cations and anions is readily derived.

Special precautions are required when working with aqueous liquids containing cyanides, arsenic, antimony and fluorine compounds, as there is the potential for production of toxic gases such as hydrogen cyanide, arsine, stibine and hydrogen fluorides. As shown in FIG. 2, caustic scrubbers 31 are located on both the hydrogen and oxygen vent lines 33. The caustic scrubbers 31 scour the hydrogen and oxygen gases during the regeneration of the resin. The presence of the cyanide ion may produce small quantities of hydrogen cyanide which are neutralized by the caustic scrubber.

Figure 3:
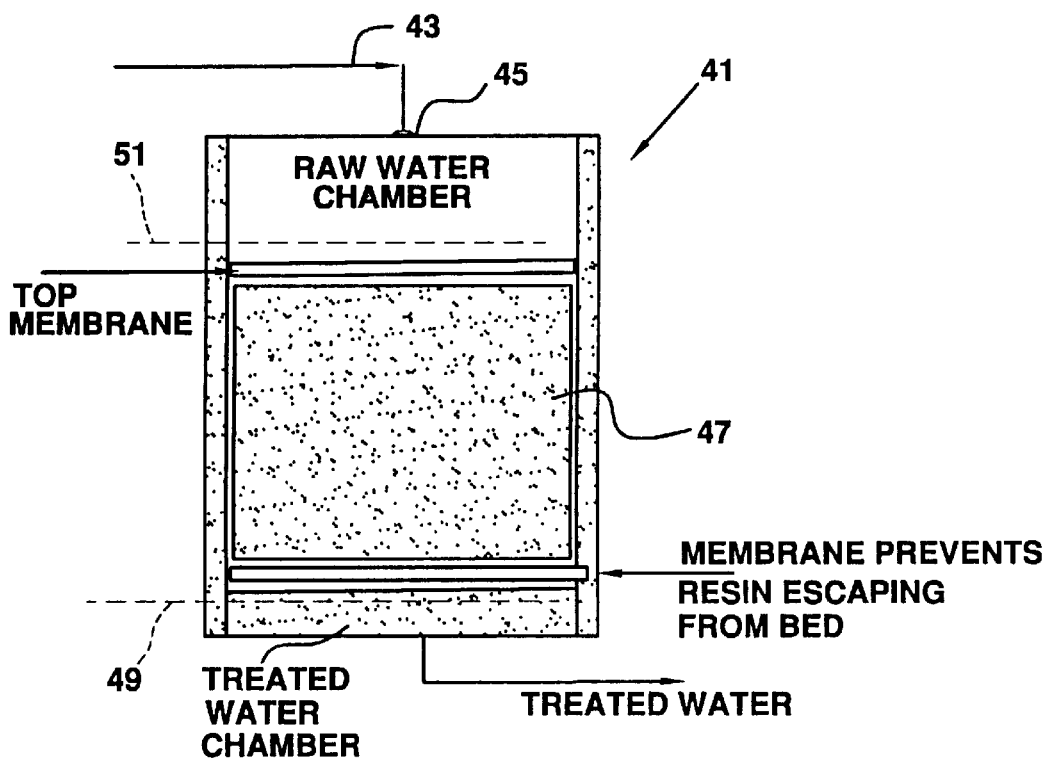
FIG. 3 schematically shows an anion exchange unit of the present invention in a service mode, where anions are concentrated on anion resin in exchange for hydroxyl ions.

FIG. 3 shows the anion exchange unit 41 in service mode where anions are concentrated on anion resin in exchange for hydroxyl ions. The strong anion exchange resin used is preferably white cellular crosslinked polystyrene having a quaternary amine functional group. That resin is first treated with a strong solution of caustic soda in order to replace the chloride ion with the hydroxyl ion. The regeneration toxic by-products include 6% strong caustic solution and the 2–3 bed volumes for bed washing and rinsing. Those toxic regeneration solutions are considered to comprise a significant disposal problem. The present invention uses an electrical current to generate hydroxyl ion and activate the resin in one step. Thus all the chemical regenerants listed above have been eliminated from the regeneration process and a significant waste disposal problem has been eliminated.

The untreated anion water 43 is added at the top 45 of the strong-base anion resin bed 47 in the downflow service mode. Breakthrough (leaching of one or more of the anions into the treated water) is determined by the relative affinity of the anions to displace the hydroxyl ion. Breakthrough testing is performed to determine if one or another of the anionic species is in the treated outlet water. An assortment of surrogate tests are available for anion presence. The tests provide indications of bed saturation or breakthrough. Raw water testing is performed to determine the species and concentrations of anions of interest in a specific raw water. When breakthrough of the critical anion occurs, the ion exchange service mode is halted and the anion exchange bed is converted to the anion exchange, anion concentration and resin recovery mode.

Figure 4:
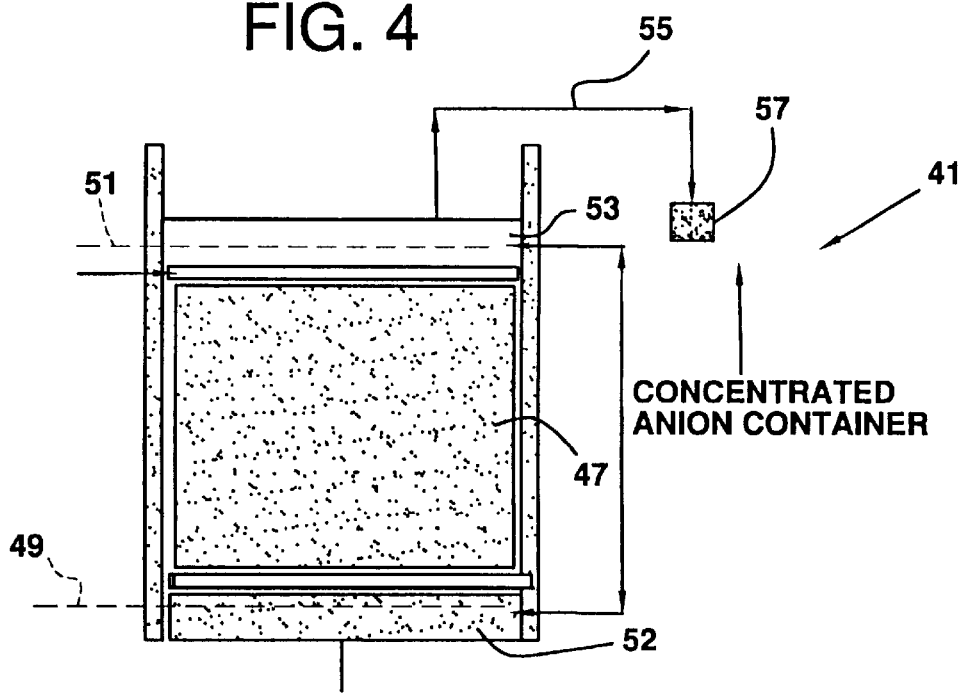
FIG. 4 schematically shows an anion exchange unit of the present invention in an anion concentration and recovery mode including cathode to anode recycle.

FIG. 4 describes the regeneration scheme of the present invention. FIG. 4 shows the steps necessary for rapid removal of the soluble toxic anion constituents. The valves are closed on the inlet and outlet of the anion resin bed. The polarity of the bottom flow-through electrode 49 is negative and the polarity of the top flow-through electrode 51 is positive.

The cathodic recycle recirculation is started by pumping caustic from below the negative electrode 49 at an elevated pH. The bottom cathode compartment 52 liquid remains clear and bright throughout the anion removal and concurrent reactivation of the anion exchange bed. The top zone 53 above the positive electrode 51 becomes "murky" which indicates that the rapidly increasing number of anions released from the resin bed are accumulating in the top liquid chamber 53 above the anode. The murkiness may also be partly due to a slight insolubility of the anions at the elevated pH. When the recirculation system is in equilibrium with hydroxyl and hydrogen ions generated from the DC power supply, the pH values in the system are relatively constant. The hydroxyl ions split, with some travelling upwards inside the resin bed and dislodging the negative anions, which immediately accumulate around the top positive electrode 51. A fraction of the hydrogen ions are neutralized by the caustic stream which is being added above the positive electrode 51. This prevents any significant acid front of hydrogen ions moving downwards into the resin bed and preventing removal of the anions. The concentrated anode electrode fluid 55 which may contain anion concentrations at 10–100 times the original anion concentration are continuously or intermittently pumped into the concentrated anion tank 57 or other container, as shown in FIG. 4.

A bench test of an anion concentration and removal unit for removal of chloride and sulfate ions is described below. In this particular test, the pH of the bed started rising from the bottom of the bed as hydroxyl ions replaced chloride or sulfate sites. Reactivation of the resin bed was caused by upwards mobility of the hydroxyl ions and removal of the sulfate and chloride ions. The target anions had all been removed and replaced by hydroxyl ions. The original 9,200 mg of total sulfates and chlorides was contained in 4 liters and the 8300 mg recovered was in a volume of 40 ml. Thus the retained concentration of the unwanted anions was increased from 2,300 mg/l to 207,500 mg/l. The treated aqueous solution was reduced to 225 mg/l of total soluble sulfates and chlorides for a significant improvement.

The present invention has applications for electrically enhanced saturation of lime slurries (calcium hydroxide) where fluorides are precipitated in a lime slurry. The solubility products for lime and calcium fluoride are extremely low and tests are now underway to provide an electrical stimulus which motivate the fluoride ions to quickly saturate and precipitate with the lime. A more rapid precipitation reduces lime costs and achieves a cost reduction in hazardous waste disposal. That item is of general interest to the petroleum refining industry worldwide. The positive electrode is placed at the bottom of a settled lime slurry bed and the negative electrode is placed at top of the of the decanted liquid which is in the same container above the settled lime bed. When the electrodes are energized, the top negative electrode pushes the fluoride ions in the direction of the slurry and towards the positive electrode located on the underside of the slurry. As soon as the fluoride level reaches an acceptable low level, the liquid decant is sent to the waste water treatment plant without further treatment. The enhancement described above temporarily increases the solubility product of calcium fluoride by a more uniform precipitation of fluoride ions.

Brief Description of Bench Scale Heavy Metals and Anion Removals

A hazardous synthetic water was prepared to simulate the Berkeley Pit in Montana. The cations were readily removed in 1.5 liters of water which flowed through a resin bed of 84 cubic cm. The dual phase recovery process indicated that more than 90 percent of the predicted heavy metals (iron 1,000 mg/l) were removed.

Cations and anions were removed from second mine wastewater. The cation of interest was iron (150 mg/l) and was totally removed.

Electrolytic removal of chromium as Cr(VI) from sandy soil containing a concentration of over 10,000 mg/l chromium produced the following results. Initially the negative chromate ions congregated near the positive electrode. Anodic reduction reactions converted a fraction of the chromate ions to Cr(III). Forty-five percent of the Cr(III) ions were removed in the concentrated cathodic liquid as Cr(III). It is assumed that soil reactions prevented conversion of all the Cr(VI) ions to Cr(III) ions.

Equipment and Devices

Preferred embodiments of the present invention preferably include the following parts.

Resin containers/Piping and Valving. These vessels are preferably made of plastic, non-conductive materials, non-grounding materials or metal tanks that are lined internally with non-conductive coatings. Piping and valves are preferably made of plastic or plastic-coated metals. The container traps are preferably made of plastic or combinations of metals and plastics. Pilot units use one cation exchange resin unit or one anion exchange resin unit, one cation and one anion exchange resin unit, and any multiple of cation and anion exchange resin units. The number and type of units is dependent on the ionic raw water concentrations of cations and anions. Resin bed size is not restricted and contains any quantity of resin provided by resin manufacturers as long as maximum process flows, minimum bed area and minimum bed height are met. For small applications, swimming pool filters are readily converted to resin exchange beds in the capacity range of 10–30 cu. ft. Possible plastics include, but are not limited to, Teflon, high strength polyethylene, and polypropylene high strength injection-molded vessels, fiberglass, non-conducting plastic linings, and the like.

The placement of electrodes, electrode materials, sizes of cathodic and anodic liquid chambers, dynamic liquid/solid removal designs, auxiliary equipment for partitioning of flocculated heavy metals/oxides and hydroxides, partitioning of soluble heavy metals, partitioning and separating of soluble and/or insoluble anions are important features of the present invention.

Computer data assessment preferably includes any or all of the following critical process variables including: temperatures of raw water and treated waters; temperatures of resin or dual phase regeneration beds; temperatures of cathodic or anodic recycle flows; breakthrough identification monitors; turbidity monitoring of raw and treated waters and any soluble cations or anions produced in the electrochemical regeneration process; pH measurements of cathodic or anodic recycles; pH measurements of resin beds in water treatment mode and electrochemical regeneration mode; pH measurements of recovery, collection, and segregation of heavy metals and anions; pH monitoring of the partitioning equipment for segregation of precipitated heavy metals, and other anions and radioactives; conductivity measurements to determine resin bed saturation or degree of removal of anions or cations from the electrochemical regeneration; monitoring of pressure drops across inlet filters, resin beds, electrochemical regeneration and heavy metals precipitation; and equipment for weighing of heavy metal collected in the partitioned and flocculated heavy metal recovery containers (e.g. zinc-rich, copper-rich and iron-rich oxide/hydroxide ores). The above listing shows only a partial collection of monitoring and control variables and is a non-exclusive and partial listing of process variables that may be used in equipment automation and improved automated separation of byproducts.

The small caustic scrubbers on the vent gas lines at cation and anion ion exchange resin beds are preferably constructed of durable plastic or 316 lined stainless steel or fined monel-grade steel. All materials are highly resistant to strong acids and bases.

Power supplies for the present invention preferably include alternating current (AC) converted to direct current (DC) devices and include all inlet power sizes from 110 volt AC to 110 volt DC up to 440 volt AC to 440 volt DC and small bench top laboratory units up to field scale size. If power is not available at a remote location, then AC/DC diesel powered arc welding machines are used where suitable fuel is available.

Current strength is an independent variable and is held constant while the dependent variable voltage registers the potential difference between the positive and negative electrodes. As stated earlier, impervious electrodes are used in the present invention to avoid possible scaling or dissolution of the electrodes. Electrode grids should always face each other and expose the largest surface area for highest efficiency. All equipment is automated with specific control equipment used for each type of water to be treated.

The present invention is very simple and well suited to automation and remote operation. The present invention may be installed, for example, in mine tunnels and at remote locations where operating sequences are transmitted by satellite.

The present invention is applicable to all hardness classifications. Typical raw waters are in hardness ranges greater than 300 mg/L of $CaCO_3$. The present invention precipitates and flocculates heavy metals, with collection, compression, and partitioning of the crystalline metals in portable or stationary containers for transfer to metal reclaimers.

The present invention removes soluble metals and soluble salts of metals in an effective and efficient manner. The present invention is applicable to broad and high ranges of concentrations of minerals and mineral complexes. The present invention offers a means of recovery of the valuable minerals and segregation and sales of these valuable minerals and achieves an overall reduction in waste volume from the process.

The present invention uses produced hydrogen ions for accelerating removal of the soluble heavy metals from the surfaces of the cation resin bed and converts the energy to produce recombined water into electrochemical gradients which will be used to separate heavy metals by precipitation. FIG. 2 shows the continuous cathodic high pH caustic recycle which flows from the top of the dual phase crystalline heavy metal chamber and enters below the electrified anode. The upward flow drives the produced hydrogen ions up through the resin bed while at the same time preventing a fraction of the hydroxyl ions from travelling down into the resin bed and forming water. As the upflow of acidic liquid passes through the cathode there is an immediate electrochemical gradient change in pH. Above the cathode an electrochemical basic increase in pH results. A hydrodynamic effect is observed which significantly improves the precipitation of the heavy metals. The continuous caustic recycle performs another important function of acting as a carrier fluid in moving the precipitated metals into the metals removal trap and returning the clean fluid into the bottom of the resin bed. An additional benefit is that the heavy metal precipitation reactions are not instantaneous and the volume of line and metals removal trap capacity increases the overall heavy metal removal efficiency.

The present invention uses the largest area of the positive electrode facing the largest area of the negative electrode. That arrangement achieves the lowest electrode current density for the input current and voltage applied. Other arrangements tend to lead to higher electrical costs, misuse of equipment and failure of the anode through either heavy scaling or dissolution of the anode itself. The anodes should not be placed in the resin bed. The resin is heated and operates at reduced demineralization efficiency, causing an additional risk of resin collecting and baking onto the anodes. Current efficiency declines and reduces the production of the caustic and regeneration intervals are extended and demineralization capacity is reduced.

Figure 5:
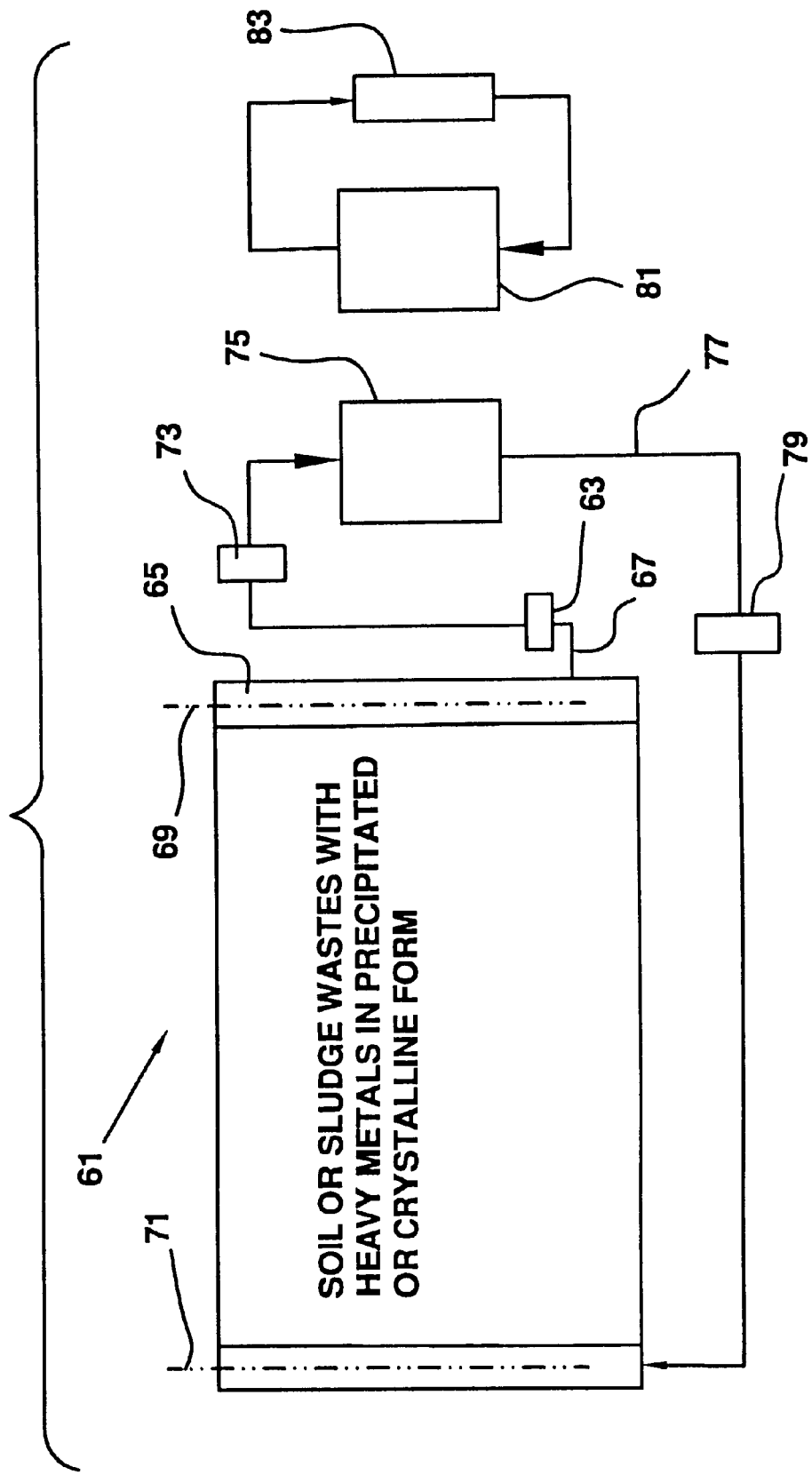
FIG. 5 schematically shows an accelerated removal of heavy metals using a unique charge balancing system and indicates that heavy metals can be removed at 3–5 times the rate of existing standard electrokinetic remediations.

As shown in FIG. 5, the present invention removes heavy metal cations from soils and wastes and collects those soluble heavy metal cations much faster than by current electrokinetic technology. The resin beds are rapidly loaded with heavy metals. A new lightweight silver electrode is used for anode and cathode positions in the soil beds. The silver electrodes are made using rare-earth iridium catalyst coated titanium grid electrodes in slim rectangular form. The electrodes have the unique capability of operating at very high current densities.

Computer acquisitioned data is assessed by a proprietary computer data acquisition program to monitor variables in soil and liquids. Sensors used include but are not limited to air temperature, time, input voltage, input amperage, power, soil site voltage, liquid flow monitors, soil pH, conductivity, soil surface and downhole temperatures, percent moisture of soils, charge balancing electrode pH, resistivity of soil and the like.

As shown in FIG. 5, the unique charge balancing system 61 includes pumping the liquid using a pump 63 from the cathode chamber 65 at rates appropriate to soils or wastes designated as sandy, clayey sand, sandy clay, clay, peat and the like. The rates may vary from 10–1,000 gallons per hour depending on soil or waste type and size. The cathode 69 becomes a secondary anode and pH is maintained at about 2.0–2.5. The low pH prevents significant plating on the secondary anode 69, and no sludges form at the low pH. Level control is maintained at the cathode 69 (or secondary anode) to insure a static height in the cathode chamber 65.

FIG. 5 schematically shows the component parts of the Charge Balancing System 61 in the present invention for accelerated removal of heavy metals from a contaminated soil or sludge waste. A positive electrode in the contaminated soil or sludge waste 71 a negative electrode 69 in the cathode chamber 65 in the contaminated soil or sludge waste, a pumping unit 63 to move the soluble metal-laden liquid 75 from the negative electrode chamber, through the particulate removal filter 73 and into the strong acid cation resin bed 81. The cleaned liquid 83 which flows through a pH controller 77 which adjusts the pH of the circulating liquid to a range of 2.0–2.5 pH and returns the acidic liquid to the anode 3. The low pressure zone created in the vicinity of the cathode by the pumping unit 63 starts removing the liquid and lowers the liquid level in the cathode compartment 69 coupled with the high pressure created at the anode 71 results in initiation of an increasing liquid flow over the above circuit. The anode 71 is equipped with a high/low level flow controller and excess acidic liquid will be distributed at the surface in the vicinity of the anode. The cathode is equipped with a high/low level flow controller which maintains a liquid level of not less than three fourths of the cathode compartment. The total liquid flow is continually increasing across and throughout the contaminated soil or sludge waste site as time passes.

The secondary anode 69 is a cathode and still has a negative charge at the surface, but the charge balancing system 61 depresses the pH and prevents plating and the production of sludges in the cathode compartment 65. Additionally, as the rectangular silver electrode remains clean, there is no loss in applied DC power efficiency, and site remediation costs will be cheaper. A flow controller at the primary anode prevents overflow at the primary anode 71.

The flow 67 from the secondary anode 69 passes through a particulate filter 73, which removes any precipitated compounds and/or soil particulates, if needed. An optional activated carbon filter is employed if organic compounds (chelating agents) are present in the site fluids. The pumped fluid from the secondary anode circulating filter 73 enters downflow into the proprietary strong acid heavy metal ion exchange unit 75.

In the first stage the proprietary ion exchange unit 75 collects soluble heavy metals at a low pH. The unit 75 can use most commercial resins, and the soluble heavy metals are captured on the activated resin bed sites in order of the relative affinity of the particular heavy metal for the particular resin. The site exchange reaction involves the removal of hydrogen ions which are replaced at the activated resin sites by the heavy metals. The special ion exchange unit 75 concentrates and collects the metals as part of a two stage process metal collection and resin bed regeneration process. The outlet fluid 77 from the resin bed ion exchange unit 75 is relatively free of metals.

The outlet liquid 77 with its pH adjusted through the pH controller 79 is returned to the anode 71. Either mineral acids or organic acids may be used, depending on regulatory requirements for environmental protection of the soils in the site. The circulating liquid system volume can vary from 50 to 100 times faster than the fluid flow from a regular electrokinetic cell which uses only electro-osmosis and electromigration to move the fluid through the soil bed. The circulating liquid returns to the anode 71 at approximately the same acidity as the anode 71. The heavy metals have been removed in the resin bed 75, and the anodic acid flow is capable of removing heavy metals at significantly increased rates when compared to removal rates of conventional electrokinetic processes.

When the ion exchange bed 81 is full of metals and breakthrough (exit liquid 83 from the resin bed contains small traces of the heavy metals), the inlet heavy metal-laden liquid flow will be switched to a standby ion exchanger containing regenerated resin and new resin exchanger 79 will be placed in service and the original ion exchange unit 81 will be regenerated. The heavy metal regeneration products will be sequentially placed in containers which contain metal-rich fractions of commercial metals. There is no liquid waste produced. The silver electrodes used sustain a high current density and are not prone to metal plating or fouling, thus maintaining a high electrical efficiency.

The heavy metal removal rates from the same site using standard electrokinetic technology and utilizing electro-osmotic and electro-migration forces, are only a small fraction of the heavy metals removed by the charge balancing process. The soluble concentration of remediated heavy metals are lower using standard electrokinetic technology. Partial plating of metal mixtures and precipitated metal oxides/hydroxides occur at the cathodes. Complex gravity sludges which contain metal mixtures as well as soil fractions are deposited in the bottom of the cathode compartment. These gravity sludges can cause site short circuiting and loss of power. Higher power must be used than from an equivalent charge balanced site and fouling of the cathodes results in a power inefficiency. Additional volumes of hazardous wastes are produced as complex metal precipitates and sludges. Site hot spots of heavy metals and areas which contain low electrical gradients are not properly regenerated. Periodic cleaning of electrodes which involve site shutdown and produce hazardous wastes are a normal feature of standard electrokinetic soil/waste sites. All these activities extend remediation time and in many cases available funding runs out and the site is only partly regenerated. The production of large quantities of hazardous metal wastes require substantial funds for disposal of these wastes.

The major activities that account for the superior heavy metal removals when compared to the basic electrokinetic process include:

(1) The soil pH remains totally in the acid state and prevents the potential calcium precipitation which will reduce the flow of acidic liquid through the site and reduce the efficiency of heavy metal removals.

(2) There are no heavy metals in the liquid leaving the anode as these were captured by the proprietary resin bed technology. The rate of desolubilization of metals from either precipitated or crystalline structures in the soil is accelerated.

(3) The acid generated by the anode in a standard electrokinetic reaction moves through the soil bed at a typical horizontal rate of 10 cm/day in a clay site. The circulating pumped liquid of the present invention migrates across the soil bed at 200 cm/day to 500 cm/day.

(4) The circulating acid flow from the anode moves through the site at 10 gph–1,000 gph and is monitored and adjusted by the pH controller to insure maximum heavy metals removal from the soils. Heavy metals are removed at a minimum of 5–10 times the removal rates of conventional electrokinetic soil remediations.

(5) In conventional electrokinetic remediations, cathode pH control is performed by injection of circulating liquid at the cathode. This is simply a neutralization reaction required to prevent high pH bed plugging at the cathode. The charge balancing process uses the acid to also reduce the pH at the anode where the acid is used in metal desolubilization reactions. That permits significant reduction in power input to the site, a reduction in potential poisonous gas releases and lower acid requirements for neutralization of hydroxyl ions at the cathode. A further power efficiency was discussed earlier in that the secondary anode (cathode) has a controlled acidic pH, which prevents precipitation on the silver electrode and minimizes production of sludges. The silver electrodes stay clean and negligible quantities of cathode sludges are produced.

(6) The present invention is ideal for removal of hot spots (high heavy metal concentrations) as well as for removal of heavy metals from areas where low voltages and current densities are observed (skipped area of remediation). The liquids can be concentrated at the anodes and secondary anodes and quickly remove those anomalies.

The present invention further includes a similar system for the anode where anions of interest are pumped from the anode, routed through a strong anion resin bed exchanger, and returned to the cathode. A pH control system is employed to keep the cathode in an acidic condition to prevent precipitation at the cathode. The rate of removal of the anions from the soil bed is greatly accelerated in a similar manner to the heavy metal cations discussed above.

While the invention has been described with reference to specific embodiments, modifications and variations of the invention may be constructed without departing from the scope of the invention, which is defined in the following claims.

We claim:

1. An apparatus for removing heavy metals, cations and complex ions acting as cations from media comprising a vessel having an inlet, an outlet, a cation exchange chamber, an untreated media chamber positioned between the inlet and the cation exchange chamber, and a treated media chamber positioned between the outlet and the cation exchange chamber, at least one cation exchange resin bed provided in the cation exchange chamber, a first membrane separating the untreated media chamber from the cation exchange chamber, a second membrane separating the treated media chamber from the cation exchange chamber, a first electrical grid positioned in the untreated media chamber, a second electrical grid positioned in the treated media chamber, a removal trap having a first end connected to the untreated media chamber and a second end connected to the treated media chamber, and a power source connected to the first and second electrical grids.

2. The apparatus of claim 1, further comprising an inlet filter for filtering the media prior to entering the untreated media chamber.

3. The apparatus of claim 2, wherein the inlet filter is selected from the group consisting of a cartridge and a sand bed.

4. The apparatus of claim 1, further comprising an anion exchange chamber connected to the cation exchange chamber and positioned between the first membrane and the second membrane, at least one anion exchange resin bed positioned in the anion exchange chamber, a third electric grid positioned in the untreated media chamber above the at least one anion exchange resin bed, and a fourth electric grid positioned in the treated media chamber beneath the at least one anion exchange resin bed.

5. The apparatus of claim 1, further comprising at least one hydrogen vent line extending from the vessel, at least one oxygen line extending from the vessel, a hydrogen caustic scrubber positioned in the at least one hydrogen line, and an oxygen caustic scrubber positioned in the at least one oxygen line.

6. The apparatus of claim 5, wherein scrubbers are made of material highly resistant to strong acids and bases.

7. The apparatus of claim 6, wherein scrubbers are made of material selected from the group consisting of plastic, lined stainless steel and lined monel-grade steel.

8. The apparatus of claim 1, wherein the electrical grids are impervious to acids and bases.

9. The apparatus of claim 1, wherein the cation exchange bed further comprises strong acid ion exchange resin.

10. The apparatus of claim 9, wherein the resin has a macroporous structure, is crosslinked with polystyrene and has a functional group.

11. The apparatus of claim 10, wherein the functional group is sulfonic acid.

12. The apparatus of claim 1, wherein the first electric grid is a negative electrode and the second electric grid is a positive electrode.

13. The apparatus of claim 1, wherein the removal trap is selected from the group consisting of a stationary filter, a portable filter, a separation device and a partitioned collection system that separates valuable metals from invaluable metals.

14. The apparatus of claim 13, wherein the separation device is a sedimentation unit.

15. The apparatus of claim 1, wherein the vessel further comprises a container, valves and pipes, wherein the vessel is made of materials selected from the group consisting of plastic, non-conducting materials, non-grounding materials, metal lined internally with non-conductive coatings, and combinations thereof.

16. The apparatus of claim 1, further comprising controls for detecting, monitoring and controlling conditions selected from the group consisting of temperature, breakthrough, turbidity, pH, conductivity, pressure and combinations thereof.

17. The apparatus of claim 1, wherein the first electric grid faces the second electric grid with a maximum grid surface area of the first grid facing a maximum grid surface area of the second grid.

18. An apparatus for removing anions and complex ions acting as anions from media comprising a vessel having an inlet, an outlet, an anion exchange chamber, an untreated media chamber positioned between the inlet and the anion exchange chamber, and a treated media chamber positioned between the outlet and the anion exchange chamber, at least one anion exchange resin bed provided in the cation exchange chamber, a first membrane separating the untreated media chamber from the anion exchange chamber, a second membrane separating the treated media chamber from the anion exchange chamber, a first electrical grid positioned in the untreated media chamber, a second electrical grid positioned in the treated media chamber, a return line for returning media from the treated media chamber to the untreated media chamber, and a power source connected to the first and second electrical grids.

19. The apparatus of claim 18, further comprising a pump for pumping the media from the treated media chamber to the untreated media chamber through the return line.

20. The apparatus of claim 18, further comprising a concentrate anion tank connected to the untreated media chamber.

21. The apparatus of claim 18, wherein the first electric grid is a positive electrode and the second electric grid is a negative electrode.

22. The apparatus of claim 18, further comprising an cation exchange chamber connected to the cation exchange chamber and positioned between the first membrane and the second membrane, at least one cation exchange resin bed positioned in the cation exchange chamber, a third electric grid positioned in the untreated media chamber above the at least one cation exchange resin bed, and a fourth electric grid positioned in the treated media chamber beneath the at least one cation exchange resin bed.

23. The apparatus of claim 18, further comprising at least one hydrogen vent line extending from the vessel, at least one oxygen line extending from the vessel, a hydrogen caustic scrubber positioned in the at least one hydrogen line, and an oxygen caustic scrubber positioned in the at least one oxygen line.

24. The apparatus of claim 23, wherein scrubbers are made of material highly resistant to strong acids and bases.

25. The apparatus of claim 24, wherein scrubbers are made of material selected from the group consisting of plastic, lined stainless steel and lined monel-grade steel.

26. The apparatus of claim 18, wherein the electrical grids are impervious to acids and bases.

27. The apparatus of claim 18, wherein the vessel further comprises a container, valves and pipes, wherein the vessel is made of materials selected from the group consisting of plastic, non-conducting materials, non-grounding materials, metal lined internally with non-conductive coatings, and combinations thereof.

28. The apparatus of claim 18, further comprising controls for detecting, monitoring and controlling conditions selected from the group consisting of temperature, breakthrough, turbidity, pH, conductivity, pressure and combinations thereof.

29. The apparatus of claim 18, wherein the first electric grid faces the second electric grid with a maximum grid surface area of the first grid facing a maximum grid surface area of the second grid.

30. The apparatus of claim 18, wherein the anion exchange bed further comprises strong anion exchange resin having crosslinked polystyrene having functional groups.

31. The apparatus of claim 30, wherein the functional groups comprises quaternary amine.

32. A method for removing heavy metals, cations, and complex ions acting as cations from media, comprising the steps of providing a vessel having an inlet, an outlet, and a cation exchange chamber, providing an untreated media chamber positioned between the inlet and the cation exchange chamber, and providing a treated media chamber positioned between the outlet and the cation exchange chamber, providing at least one cation exchange resin bed in the cation exchange camber, providing a first membrane separating the untreated media chamber from the cation exchange chamber, providing a second membrane separating the treated media chamber from the cation exchange chamber, providing a first electrical grid positioned in the untreated media chamber, providing a second electrical grid positioned in the treated media chamber, providing a removal trap having a first end connected to the untreated media chamber and a second end connected to the treated media chamber, and providing a power source connected to the first and second electrical grids.

* * * * *

UNITED STATES PATENT AND TRADEMARK OFFICE
CERTIFICATE OF CORRECTION

PATENT NO : 6,074,537

DATED : June 13, 2000

INVENTOR(S): Marks et al.

It is certified that error appears in the above-identified patent and that said Letters Patent are hereby corrected as shown below:

On the title page, under item [54], "EQUIPMENT FOR ELECTOCHEMICAL COLLECTION REMOVAL OF IONS" should be --EQUIPMENT FOR ELECTROCHEMICAL COLLECTION AND REMOVAL OF IONS--.

Signed and Sealed this

First Day of May, 2001

Attest:

NICHOLAS P. GODICI

*Attesting Officer*     *Acting Director of the United States Patent and Trademark Office*